(12) United States Patent
Farchi et al.

(10) Patent No.: US 8,141,050 B2
(45) Date of Patent: Mar. 20, 2012

(54) DEADLOCK DETECTION BY LOCK CLASSIFICATION

(75) Inventors: Eitan Farchi, Pardes Hana (IL); Yarden Nir-Buchbinder, Haifa (IL); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 1592 days.

(21) Appl. No.: 11/326,541

(22) Filed: Jan. 5, 2006

(65) Prior Publication Data

US 2007/0156939 A1    Jul. 5, 2007

(51) Int. Cl.
*G06F 9/44* (2006.01)
*G06F 7/00* (2006.01)

(52) U.S. Cl. ........ 717/127; 717/124; 717/132; 717/133; 707/687; 707/704

(58) Field of Classification Search .................. 717/124, 717/125, 126, 127, 132, 133
See application file for complete search history.

(56) References Cited

U.S. PATENT DOCUMENTS

| | | | | |
|---|---|---|---|---|
| 6,009,405 A | * | 12/1999 | Leymann et al. | 705/9 |
| 6,256,637 B1 | * | 7/2001 | Venkatesh et al. | 707/103 Y |
| 6,735,760 B1 | * | 5/2004 | Dice | 717/139 |
| 2002/0099765 A1 | * | 7/2002 | Otis | 709/203 |
| 2002/0138544 A1 | * | 9/2002 | Long | 709/107 |
| 2003/0097360 A1 | * | 5/2003 | McGuire et al. | 707/8 |

OTHER PUBLICATIONS

IBM Technical Disclosure Bulletin, "A Simple Solution to Database Parallelism Locking Problems," Apr. 1, 2001, IBM, Issue 444, p. 692.*
Visser, Havelund, Brat, Park and Lerda: "Model Checking Programs," Journal of Automated Software Engineering, 10(2): 203-232, Apr. 2003.
Microsoft's driver Verifier™ See http://msdn.microsoft.com/library/.

* cited by examiner

*Primary Examiner* — Emerson Puente
*Assistant Examiner* — Jonathan R Labud
(74) *Attorney, Agent, or Firm* — Jason Far-Hadian (57) ABSTRACT

Systems and methods for detecting a potential deadlock in a computing execution environment are provided. A plurality of locks taken during one or more test runs are monitored. A runtime identity and a code location for each of the plurality of locks are identified during each test run. One or more locks among the plurality of locks are classified as same locks based on the runtime identity and code location identified for each lock.

20 Claims, 5 Drawing Sheets

DEADLOCK DETECTION BY LOCK CLASSIFICATION

COPYRIGHT & TRADEMARK NOTICES

A portion of the disclosure of this patent document contains material which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to multiprocessing computing environments and, more particularly, to a system and method for detecting potential deadlocks by classifying the locks taken in a computing environment based on the locks' runtime identity and code location.

BACKGROUND

In a multiprocessing computing environment, more than one process may actively use the resources available in the computing environment. To avoid corruption of a resource due to the concurrent use or modification by multiple processes, a process may lock a resource and release the lock after the process has finished using the process.

In some situations, a deadlock occurs when two processes or two elements (e.g., threads) in a process are each waiting for the other to release a lock, before one can continue. Occurrence of a deadlock is disruptive. Thus, software applications and multiprocessing environments in which the applications operate are typically tested to determine and prevent deadlocks.

A methodology called a lock discipline may be used to avoid deadlock. A lock discipline defines the order in which a plurality of processes or threads may lock a plurality of resources in a concurrent/parallel processing environment. According to the lock discipline, when several locks need to be taken together, each lock is taken in a predefined order, so that all active processes or threads may share resources without creating a deadlock situation.

A directed graph, having multiple nodes and edges that connect the nodes, can be implemented to graphically represent a lock discipline. Nodes in the graph represent the locks, and an edge connecting, for example, a first node A to a second node B represents the possibility of taking consecutive locks A and B (i.e., B nested within A). Once a lock discipline is defined for a given system, it is desirable to have a tool that will indicate whether the system indeed adheres to the lock discipline.

NASA's Java PathFinder (JPF)™ is one such tool that uses dynamic analysis to monitor locks taken by a plurality of threads at runtime. JPF uses a special Java Virtual Machine (JVM)™ to determine the threads and the order in which the locks are taken, so that violations of lock discipline can be revealed. JPF is especially suited for analyzing multi-threaded Java applications, where normal testing usually falls short. JPF can find deadlocks and violations of Boolean assertions stated by the programmer in a special assertion language. (See Visser, Havelund, Brat, Park and Lerda: "Model Checking Programs," Journal of Automated Software Engineering, 10(2): 203-232, April 2003.)

Microsoft's Driver Verifier™ is another tool that can monitor kernel-mode drivers and graphics drivers to verify that they are not making illegal function calls or causing system corruption. This tool can perform a large number of checks on the mentioned drivers, as well as subject them to a variety of stresses and test to flush out improper behavior. (See http://msdn.microsoft.com/library/)

A test suite for determining violation of lock discipline is typically composed of many small tests. Each test is run by a distinct process that activates selected short test paths. The above tools identify violations of lock discipline during test runtime, but only look within the scope of one process during each test run. As such, if a cycle in the directed graph is caused by lock sequences from two different test runs, the above tools cannot reveal it.

Furthermore, these tools are applicable only to inter-thread locks within one process (i.e., mutexes) and therefore cannot be easily utilized in other environments. For example, the above tools cannot be successfully applied to determine deadlock for locks used to synchronize processes, such as file locks.

Thus, deadlock analysis and prevention methods and systems are needed that can overcome the aforementioned shortcomings by revealing deadlocks across different test runs.

SUMMARY

The present disclosure is directed to a system and corresponding methods that facilitate detecting potential deadlocks across different test runs in an execution environment.

For purposes of summarizing, certain aspects, advantages, and novel feature of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for detecting a potential deadlock in a computing execution environment is provided. The method comprises monitoring a plurality of locks taken nestedly during one or more test runs; identifying a runtime identity for each of the plurality of locks during each test run; identifying a code location for each of the plurality of locks during each test run; and determining that one or more locks among the plurality of locks belong to a first class based on the runtime identity and code location identified for each lock.

In accordance with another aspect of the invention, a system for detecting a potential deadlock in a computing execution environment is provided. The system comprises a logic unit for monitoring a plurality of locks taken nestedly during one or more test runs; a logic unit for identifying a runtime identity for each of the plurality of locks during each test run; a logic unit for identifying a code location for each of the plurality of locks during each test run; and a login unit for determining that one or more locks among the plurality of locks belong to a first class based on the runtime identity and code location identified each lock.

In another embodiment, a computer program product comprising a computer useable medium having a computer readable program is provided. The computer readable program when executed on a computer causes the computer to monitor a plurality of locks taken nestedly during one or more test runs; identify a first runtime identity for a first lock during a test run; identify a first code location for the first lock during each test run; and determine that the first lock belongs to a first class based on the first runtime identity and the first code location.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF PREFERRED EMBODIMENTS

The present disclosure is directed to systems and corresponding methods that facilitate detecting potential deadlocks in a multiprocessing environment by way of classifying locks based on the locks' runtime identity and code location in one or more test runs. For each test run, a log is generated that includes the runtime identity and code location associated with each lock operation. The log content is then analyzed to identify and group one or more locks that belong to the same class.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
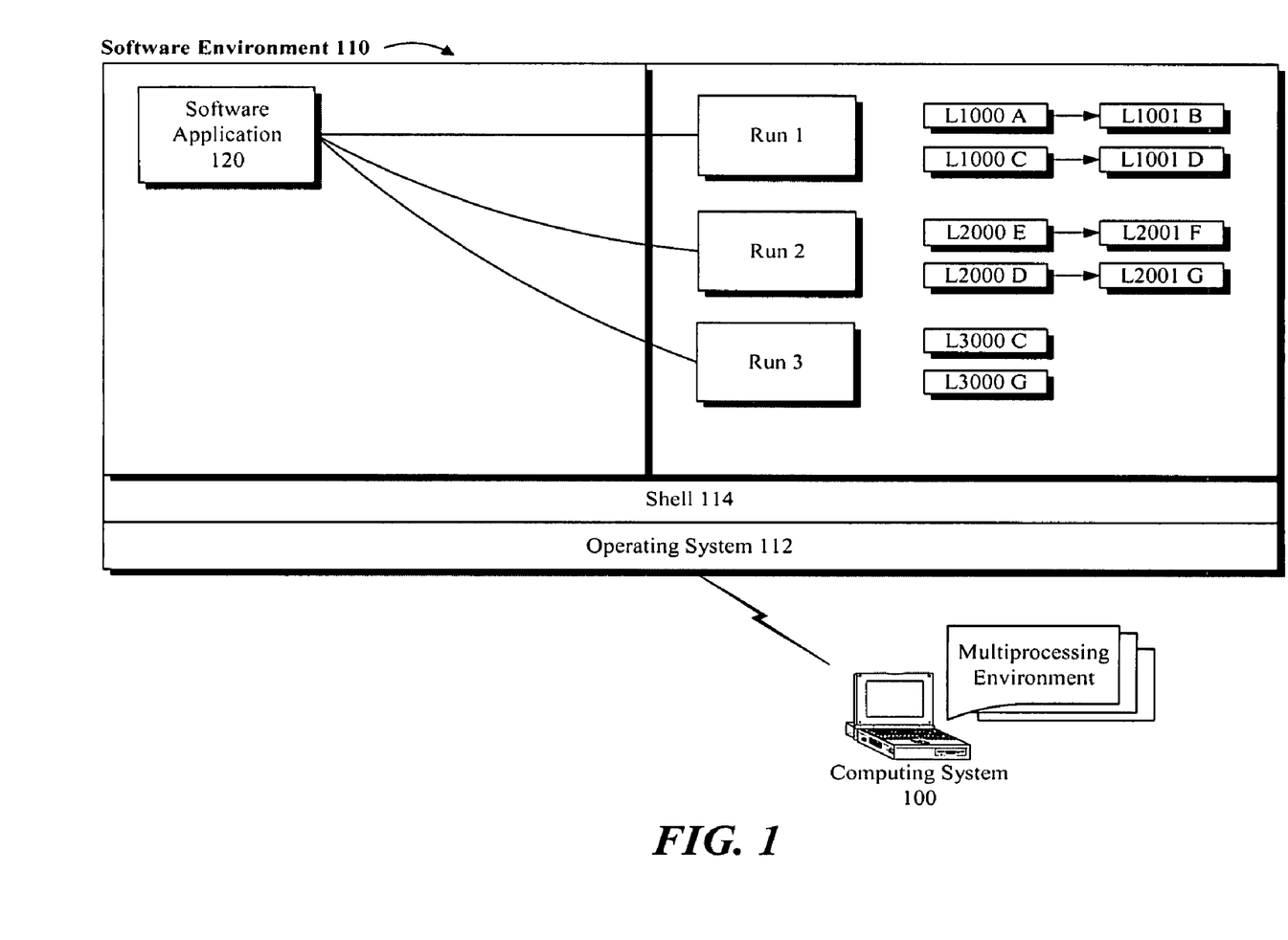
FIG. 1 illustrates an exemplary software environment in accordance with one or more embodiments of the invention, wherein a plurality of locks may be taken in sequence during several test runs.

Referring to FIG. 1, an exemplary runtime environment illustrated as software environment 110 comprises an operating system 112 having a shell 114 loaded onto a computing system 100. In accordance with one aspect of the invention, software environment 110 supports a multiprocessing environment in which a software application 120 can be executed on top of operating system 112.

Software application 120 is configured to execute a plurality of test runs to determine potential deadlocks in a system under test. The system under test (hereafter "the system") may be a logic code, software application, program code, or any other logic routine or device in which one or more locks may be taken nestedly in a multiprocessing environment.

Several test runs may be used to identify deadlock potentials and to produce a lock discipline, for example. An exemplary lock discipline may be graphically represented by a number of nodes and edges connecting the nodes. As shown in FIG. 1, for example, each node (e.g., L1000A) represents a lock taken during a test run, and each edge represents a lock that may be taken in sequence without violating the lock discipline.

In the exemplary runtime environment of FIG. 1, three distinct test runs (e.g., Run 1, Run 2 and Run 3) are depicted. During the first run, nodes L1000A, L1001B, L1000C and L1001D are generated with a first edge connecting L1000A to L1001B, and a second edge connecting L1000C to L1001D, for example. The first edge (e.g., L1000A->L1001B) indicates that a lock operation with runtime identity "1001" and code location "B" (i.e., L1001B) was taken nestedly within a lock operation with runtime identity "1000" and code location "A" (i.e., L1000A), during the first run.

The other edges (e.g., L1000C->L1001D, L2000E->L2001F, etc.) likewise represent sequence of locks taken during a plurality of test runs. In some embodiments, each test run is separately executed, therefore the relationship between locks taken during each run may not be reflected in the graph illustrated FIG. 1, even if the locks across different runs are associated with the same code location or have the same runtime identity.

According to one aspect of the invention, software application 120 is configured to identify and trace the runtime identity and code location associated with one or more locks during each run. Runtime identity (hereafter "runtime ID") of a lock uniquely identifies the lock and is determined, in one embodiment, based on the runtime ID of an object associated with the lock, and preferably refers to the location in the runtime environment (e.g., memory address) where the object resides.

In one embodiment, for example, the runtime ID is directly or indirectly associated with a memory address in the runtime environment, wherein the runtime ID points to an instance of the lock object. An exemplary embodiment of the invention may be implemented in Java programming language, wherein the runtime ID for a lock object is returned by a call to java.lang.System.identityHashCode( ).

In some embodiments, the code location refers to a location (e.g., line number, routine name, etc.) in the code or tested system where an instance of an object associated with the lock is called or created or the location of a lock operation where the lock is used In an exemplary embodiment, the code location for a lock is determined by way of instrumentation of the code to return a location value when a lock is taken during a test run.

Figure 2:
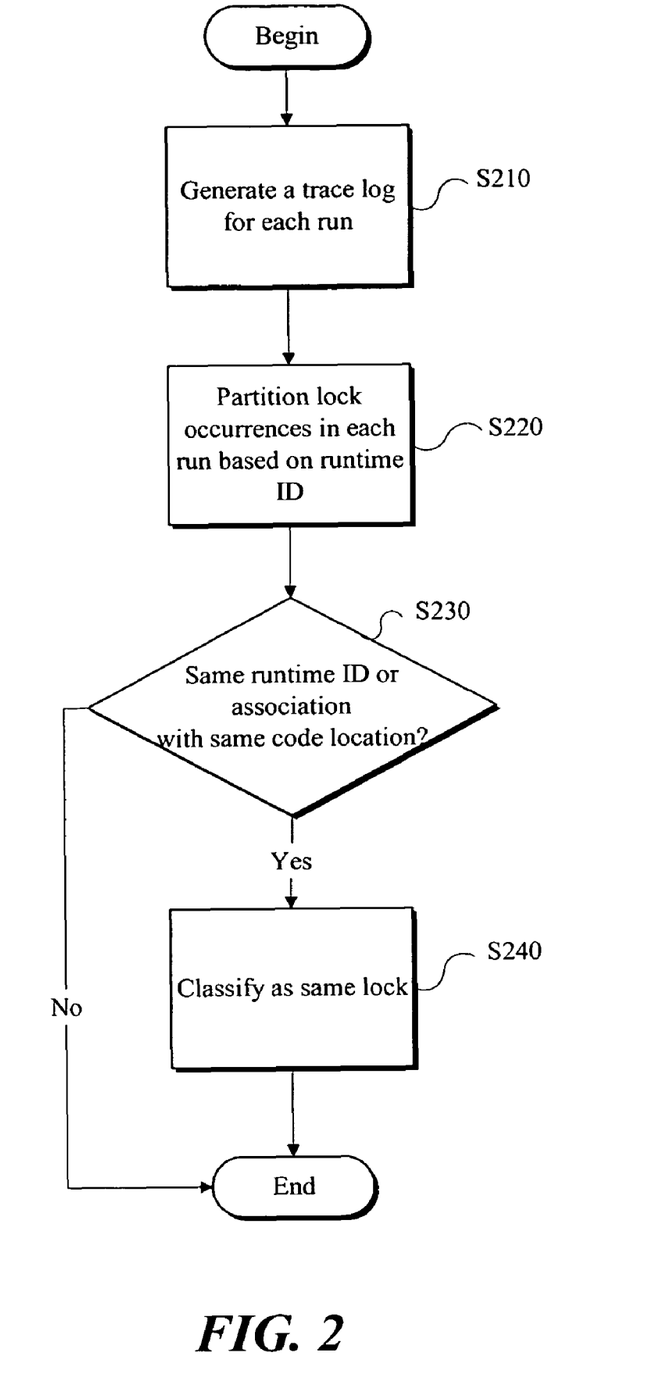
FIG. 2 is a flow diagram of a method for detecting a potential deadlock by classifying locks taken during the test runs, in accordance with one embodiment.

Referring to FIGS. 1 and 2, to determine potential deadlock in the system, software application 120 is configured to generate a trace log for each test run (S210). A trace log is a data structure that comprises information about the runtime ID and code location of locks taken during the one or more test runs. The data structure may be implemented in form of a database with a plurality of records, a text file or any other format suitable for recording and tracking the respective information for one or more locks taken during each run.

Depending on implementation, lock information for each test run may be separately or collectively recorded in one or more trace logs, without detracting from the scope of the invention. For example, information related to locks L1000A, L1001B, L1000C and L1001D taken in the Run 1 may be recorded in a first trace log, while information related to locks taken in Run 2 may be recorded in a second trace log. Alternatively, information for both Run 1 and Run 2 may be recorded in a single trace log, or across several trace logs.

As provided earlier, for each lock taken, the trace log comprises information identifying the lock operation based on a runtime ID and a code location, for example. Furthermore, information about the relationship (e.g., nested locks, lock sequences, etc.) may be recorded in the trace log, in accordance with certain embodiments.

Referring to FIG. 1, an exemplary trace log may comprise the entries and information illustrated in Table 1. It is noteworthy, however, that the format or order in which the information is provided in Table 1 is by way of example.

TABLE 1

| Run | Lock | Runtime ID | Location |
|-----|-------|------------|----------|
| 1 | L1000A | 1000 | A |
| 1 | L1001B | 1001 | B |
| 1 | L1000C | 1000 | C |
| 1 | L1001D | 1001 | D |
| 2 | L2000E | 2000 | E |
| 2 | L2001F | 2001 | F |
| 2 | L2000D | 2000 | D |
| 2 | L2001G | 2001 | G |
| 3 | L3000C | 3000 | C |
| 3 | L3000G | 3000 | G |

In a preferred embodiment, software application 120 is configured to partition lock occurrences in each run based on the locks' runtime ID (S220). This partitioning process results in the grouping of the locks that have the same runtime ID together. Thus, in the exemplary locks shown in Table 1, the locks for each run may be grouped as provided below in Table 2.

TABLE 2

| Run | Lock | Runtime ID | Location |
|-----|-------|------------|----------|
| 1 | L1000A | 1000 | A |
| 1 | L1000C | 1000 | C |
| 1 | L1001B | 1001 | B |
| 1 | L1001D | 1001 | D |
| 2 | L2000E | 2000 | E |
| 2 | L2000D | 2000 | D |
| 2 | L2001F | 2001 | F |
| 2 | L2001G | 2001 | G |
| 3 | L3000C | 3000 | C |
| 3 | L3000G | 3000 | G |

Software 120, by grouping the locks based on their runtime ID, can determine one or more locks that are the same during each run, including the locks that are taken in different locations within the code. For example, Table 2 illustrates that locks L1000A and L1000C are instances of same lock object associated with runtime ID 1000, even though the former lock is associated with code location A and the latter lock is associated with code location C.

In one embodiment, software 120 further determines if one or more locks are associated with the same location, preferably regardless of the locks' runtime ID. Thus, an exemplary embodiment of the invention may be implemented to group the locks with respect to the locks' code location either before, after, or at the same time the locks are partitioned based on the locks' runtime ID.

Thus, software application 120 can determine whether one or more of the locks have the same runtime ID or if the locks are associated with the same code location (S230). Based on this determination, software application 120 classifies one or more locks as belonging to the same class (S240). That is, a first lock is determined to belong to the same class as a second lock, if the first and second locks are associated with the same code location or if the first and second locks share the same runtime ID.

Furthermore, in a preferred embodiment, two locks are classified as the same lock if at least one of the locks is grouped with a third lock that satisfies one of the above two conditions. That is, if the third lock shares the same code location or runtime ID associated with one of the two locks, then the two locks are classified as the same lock, if at least one of the two locks is grouped with the third lock.

Figure 3:
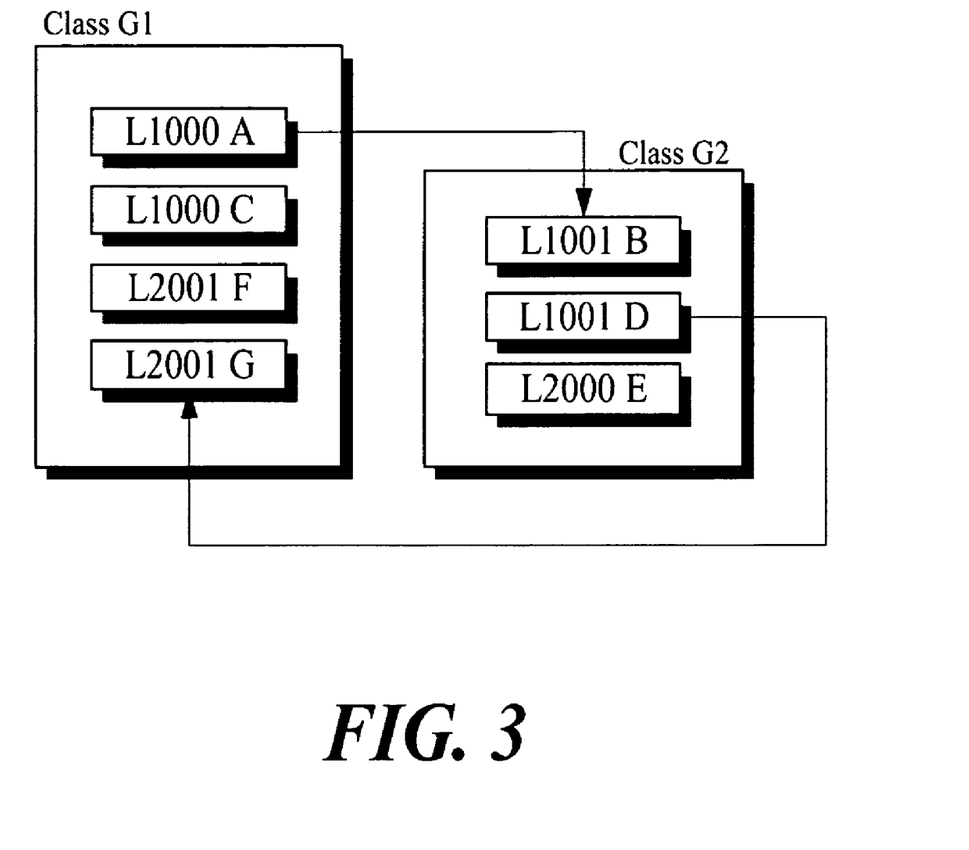
FIG. 3 is a block diagram of an exemplary group of locks classified in accordance with a preferred embodiment.

For example referring to Table 2 and FIGS. 1 and 3, locks L1000A, L1000C, L2001F and L2001G are determined to be part of the same class because locks L1000A and L1000C are associated with the same runtime ID 1000; locks L2001F and L2001G are associated with the same runtime ID 2001; and locks L3000C and L3000G are associated with the same runtime ID 3000; where locks L1000C and L3000C are associated with the same code location C; and locks L2001G and L3000G are associated with the same code location G.

Once the locks are classified, preferably a directed graph such as that shown FIG. 3 can be generated. Each node in the exemplary directed graph represents a class of locks and each edge connecting a first node to a second node represents that at least one of the locks grouped in the second node can be taken nestedly by one of the locks grouped in the first node, during a test run.

Software application 120, in one embodiment, is configured to detect any cycle representative of a potential deadlock in the directed graph generated based on the lock classification procedure discussed above. Advantageously, the directed graph can be used to determine possibility of deadlock across several test runs, since the graph includes information about locks taken during several runs.

For example, as shown in FIG. 3, a possibility of deadlock is detected between two exemplary classes of locks G1 and G2. Note that lock L1001B in class G2 may be taken nestedly by lock L1000A in class G1 (i.e., represented by edge G1->G2) and lock L2001G in class G1 may be taken nestedly by lock L1001D in class G2 (represented by edge G2->G1), thus creating a cycle.

Software application 120 is configured to detect any cycles in the directed graph and report a deadlock potential. As discussed above, a cycle in the graph represents a deadlock potential, because it manifests a violation of lock discipline. Even though two nested locks may be taken during different test runs, there is a potential for the locks to be taken simultaneously.

Accordingly, deadlock potentials between multiple but independent test runs, that may not be otherwise apparent, are detected in accordance with one or more embodiments of the invention, by way of software application 120 classifying the locks into groups that identify each member as representing the same lock, even where the locks are not taken during the same test run.

In different embodiments, the invention can be implemented either entirely in the form of hardware or entirely in the form of software, or a combination of both hardware and software elements. For example, computing system 100 and software environment 110 may comprise a controlled computing system environment that can be presented largely in terms of hardware components and software code executed to perform processes that achieve the results contemplated by the system of the present invention.

Figure 4A:
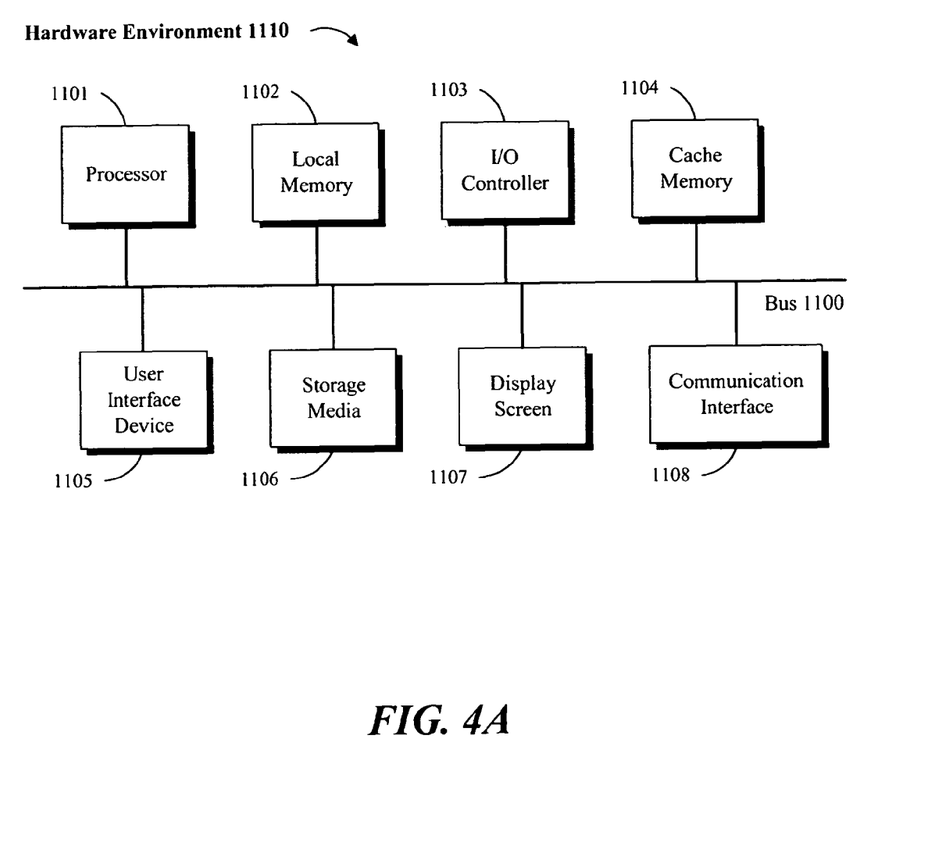
FIGS. 4A and 4B are block diagrams of hardware and software environments in which a system of the present invention may operate, in accordance with one or more embodiments.
Figure 4B:
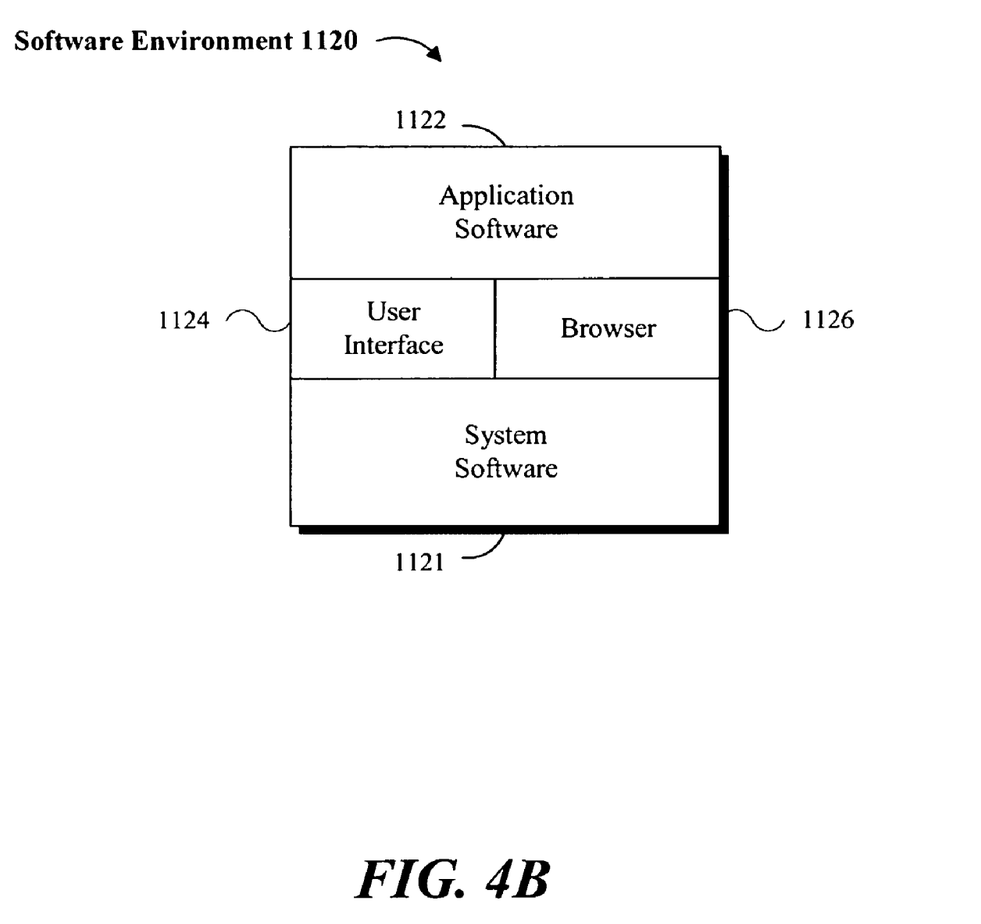

Referring to FIGS. 4A and 4B, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrates hardware elements are described in terms of specific logical/functional relationship. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In a preferred embodiment, software application 120 is implemented as application software 1122 executed on one or more hardware environments to detect a potential deadlock in a multiprocessing computing environment, as provided earlier. Application software 1122 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4A, an embodiment of the application software 1122 can be implemented as computer software in the form of computer readable code executed on a data processing system such as hardware environment 1110 that comprises a processor 1101 coupled to one or more memory elements by way of a system bus 1100. The memory elements, for example, can comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4B, application software 1122 can comprise one or more computer programs that are executed on top of system software 1121 after being loaded from storage media 1106 into local memory 1102. In a client-server architecture, application software 1122 may comprise client software and server software. For example, in one embodiment of the invention, client software is executed on computing system 100 and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing It should also be understood that the logic code, programs, modules, process, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing The present invention has been described above with reference to preferred features and embodiments. Those skilled in the art will recognize, however, that changes and modifications may be made in these preferred embodiments without departing from the scope of the present invention. These and various other adaptations and combinations of the embodiments disclosed are within the scope of the invention and are further defined by the claims and their full scope equivalents.

What is claimed is:

1. A computer-implemented method for identifying potential deadlocks in a computing execution environment, the method comprising:

executing a first executable code a plurality of test runs over one or more processors, and identifying one or more locks taken during each test run;

identifying a runtime identity for each of the one or more locks during each test run, wherein the runtime identity identified for each lock refers to a memory location of the lock during that test run;

identifying a code location for each of the one or more locks during each test run, wherein the code location identified for each lock refers to a location in the first executable code at which that lock is created or accessed during that test run;

determining that one or more locks identified during separate test runs are the same lock, if said one or more locks have a common runtime identity or a common code location; and utilizing knowledge of the same locks to prevent potential deadlocks from occurring in the first executable code during a real run, wherein two locks are further classified as the same lock if at least one of the locks is associated with a third lock that shares the same code location or runtime identity with one of the two locks.

2. The method of claim 1, wherein the determining comprises grouping locks associated with a first runtime identity together.

3. The method of claim 1, wherein the determining comprises grouping locks associated with a first code location together.

4. The method of claim 1, wherein the determining comprises:

grouping locks associated with a first runtime identity in a first group;

grouping locks associated with a second runtime identity in a second group; and grouping locks in the first and second groups associated with a first code location in a third group.

5. The method of claim 4, wherein members of the third group are classified as the same lock.

6. The method of claim 5, further comprising generating a graph wherein each node in the graph represents a group of locks identified as the same lock.

7. The method of claim 6, further comprising adding a first edge to the graph by connecting a first node to a second node, wherein the first edge represents that a member of the second node can be taken nestedly as a lock by a member of the first node.

8. The method of claim 7, further comprising detecting a potential deadlock in response to determining that addition of the first edge to the graph results in completion of a cycle in relationship with a second edge in the graph.

9. The method of claim 7, further comprising detecting a potential deadlock in response to determining that the graph comprises a second edge connecting the second node to the first node.

10. The method of claim 8, further comprising reporting the potential deadlock in response to detecting the potential deadlock.

11. The method of claim 8, further comprising reporting the locks in the first and second groups, in response to detecting the potential deadlock.

12. A system for identifying potential deadlocks in a computing execution environment, the system comprising:

a logic unit for executing a first executable code a plurality of test runs over one or more processors, and identifying one or more locks taken during each test run;

a logic unit for identifying a runtime identity for each of the one or more locks during each test run, wherein the runtime identity identified for each lock refers to a memory location of the lock during each test run;

a logic unit for identifying a code location for each of the one or more locks during each test run, wherein the code location identified for each lock refers to a location in the first executable code at which the lock is created or accessed during each test run;

a logic unit for determining that one or more locks identified during separate test runs are the same lock, if said one or more locks have a common runtime identity or code location; and a logic unit for utilizing knowledge of the same locks to prevent potential deadlocks from occurring in the first executable code.

13. The system of claim 12, further comprising:

a logic unit for grouping locks associated with a first runtime identity in a first group; and a logic unit for grouping locks associated with a code location in a second group, wherein selected locks in the first and selected lock in the second group are determined to belong to the first class, wherein the selected locks in the first and second groups are associated with at least one of:

a same code location, a same runtime identity, and a third lock associated with the same code location or the same runtime identity.

14. The system of claim 13, wherein members of the first class are classified as the same lock.

15. A computer program product comprising a computer useable medium having a computer readable program stored thereon, wherein the computer readable program when executed on a computer causes the computer to:

execute a first executable code a plurality of test runs over one or more processors, and identifying one or more locks taken during each test run;

identify a runtime identity for each of the one or more locks during each test run, wherein the runtime identity identified for each lock refers to a memory location of the lock during each test run;

identify a code location for each of the one or more locks during each test run, wherein the code location identified for each lock refers to a location in the first executable code at which the lock is created or accessed during each test run;

determine that one or more locks identified during separate test runs are the same lock, if said one or more locks have a common runtime identity or code location; and utilize knowledge of the same locks to prevent potential deadlocks from occurring in the first executable code.

16. The computer program product of claim 15, wherein the computer readable program when executed on a computer further causes the computer to:

group a plurality of locks associated with the first runtime identity in a first group; and group a plurality of locks in the first group associated with the first code location in a second group.

17. The computer program product of claim 15, wherein members of the second group are classified as the same lock.

18. The computer program product of claim 17, wherein the computer readable program when executed on a computer further causes the computer to generate a graph wherein each node in the graph represents a group of locks identified as the same lock.

19. The computer program product of claim 18, wherein the computer readable program when executed on a computer further causes the computer to add a first edge to the graph by connecting a first node to a second node, wherein the first edge represents that a member of the second node can be taken nestedly as a lock by a member of the first node.

20. The computer program product of claim 19, wherein the computer readable program when executed on a computer further causes the computer to detect a potential deadlock in response to determining that the graph comprises a second edge connecting the second node to the first node.

* * * * *